United States Patent
Ruffa

(10) Patent No.: US 11,796,511 B1
(45) Date of Patent: Oct. 24, 2023

(54) STRUCTURAL MONITORING SYSTEM

(71) Applicant: The United States of America as represented by the Secretary of the Navy, Newport, RI (US)

(72) Inventor: Anthony A Ruffa, Hope Valley, RI (US)

(73) Assignee: The United States of America as Represented by the Secretary of the Navy

( * ) Notice: Subject to any disclaimer, the term of this patent is extended or adjusted under 35 U.S.C. 154(b) by 0 days.

(21) Appl. No.: 17/724,527

(22) Filed: Apr. 20, 2022

(51) Int. Cl.
    *G01N 29/07*     (2006.01)
    *G01N 29/04*     (2006.01)
    *G01N 29/44*     (2006.01)

(52) U.S. Cl.
    CPC .......... *G01N 29/07* (2013.01); *G01N 29/045* (2013.01); *G01N 29/449* (2013.01); *G01N 29/4427* (2013.01); *G01N 2291/0289* (2013.01); *G01N 2291/105* (2013.01)

(58) Field of Classification Search
    CPC .. G01N 29/07; G01N 29/045; G01N 29/4427; G01N 29/449; G01N 2291/0289; G01N 2291/105
See application file for complete search history.

(56) References Cited

U.S. PATENT DOCUMENTS

| | | | |
|---|---|---|---|
| 2018/0074019 A1* | 3/2018 | Iida | G01N 29/07 |
| 2018/0217103 A1* | 8/2018 | Someda | G01N 29/045 |
| 2022/0018810 A1* | 1/2022 | Bingham | G01N 29/4436 |

* cited by examiner

Primary Examiner — Xin Y Zhong
(74) Attorney, Agent, or Firm — Michael P. Stanley; James M. Kasischke; Jeffry C. Severson

(57) ABSTRACT

A system and method for monitoring structural health of a beam using at least one pair of data collection devices mounted along the beam at a spacing distance to define a measurement region. A computer-implemented drive system in communication with the accelerator pairs executes instructions to monitor each measurement regions for propagating transverse waves. After initialization of a propagation speed threshold for each measurement region, a continuous and real-time monitoring loop operates the accelerometers to detect propagations of a transverse wave along the measurement region. For each propagation event, a time delay is determined and, in turn, a propagation speed for the transverse wave based on the time delay and known spacing distance of the measurement region. If the propagation speed violates the threshold set for the measurement region, an alert condition for beam damage is reported and if the propagation speed satisfies the threshold, a success condition is reported.

20 Claims, 4 Drawing Sheets

STRUCTURAL MONITORING SYSTEM

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER APPLICATIONS

None.

BACKGROUND OF THE INVENTION

(1) Field of the Invention

The present invention relates generally to technology for assessing structural elements and, more particularly, for damage identification and impact assessment for structural components that are analyzed as beams.

(2) Description of the Related Art

Non-destructive testing refers to inspection methods that non-intrusively collect information about a material. Ultrasonic non-destructive testing involves transmitting high-frequency sound waves into a material in order to identify changes in certain properties of the material. Conventional ultrasonic non-destructive testing typically focuses on imaging flaws on or near the surface of a structure. Because the testing methods focus on comparatively small areas of a structure; these methods are time-consuming when applied to a large structure.

To account for this limitation, ultrasonic non-destructive testing is often part of an automated scanning system. Such scanning systems can be cumbersome to use. Furthermore, because non-destructive testing images sometimes return superficial indicators of structural health; the flaws identified by such imaging systems typically require a follow up assessment to gauge greater structural damage.

As such, a need exists for improved non-invasive non-destructive testing systems and methods of use. Objectives include effectively assessing the structural health of large areas of structural materials without requiring separate assessments to ascertain the magnitude of damage.

BRIEF SUMMARY OF THE INVENTION

Accordingly, it is a primary object and general purpose of the present invention to assess the structural health of an element by analyzing transverse vibrations detected in the element.

In a first embodiment of the present invention, the structural health monitoring system includes at least one pair of data collection devices mounted along a cross section of the beam at a predefined spacing distance. There is no preferred spacing distance except that the spacing distance should be large enough to measure the propagation time delays. For transverse waves, this usually is not a problem, since the transverse waves propagate relatively slowly. However, dilatational waves (e.g., sound) propagate much at much higher speeds. For that measurement, the spacing should be sufficiently great to measure the time delay of the acoustic waves.

A sensor drive system executes instructions to monitor properties of each measurement region from which the structural health is deduced. After initialization of baseline values; continuous and real-time of a monitoring loop proceeds.

The monitoring loop includes each pair of data collection devices to detect the propagation of a transverse wave along the measured region. For each propagation, the sensor drive system determines a time delay and, in turn, determines a propagation speed for the transverse wave and the spacing distance of the measurement region. The sensor drive system can create the transverse wave by using a transducer.

For example, the propagation speed may be computed using an $EI/\rho A$ parameter for the measurement region, wherein "E" is Young's modulus, "I" is a moment of inertia of the measurement region, "$\rho$" is the density, and "A" is a cross-sectional area.

If the inferred propagation speed violates a threshold for the measurement region; the sensor drive system flags an alert condition. Conversely, if the inferred propagation speed satisfies the threshold for the measurement region; the sensor drive system reports a success condition. A success condition can trigger the sensor drive system to reset the threshold.

A method of monitoring the structural health of a beam initializes baseline values such as a spacing distance and a propagation speed threshold for each measurement region while monitoring the measurement regions. The monitoring includes: detecting a propagation event for a transverse wave along the measurement region; determining a time delay for the propagation event; determining a propagation speed for the transverse wave based on the time delay and the spacing distance; upon a mismatch of the propagation speed and the threshold, reporting an alert condition; and upon a match of the propagation speed and the threshold, reporting a success condition. As a result of a success condition; the threshold can be set to the propagation speed of a healthy measurement region for subsequent steps in the monitoring loop. To facilitate ongoing monitoring; a transducer can create a transverse wave.

These and other objects, features, and advantages of the present invention will become more readily apparent from the attached drawings and the detailed description of the invention.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals and symbols designate identical or corresponding parts throughout the several views and wherein.

DETAILED DESCRIPTION OF THE INVENTION

Figure 1:
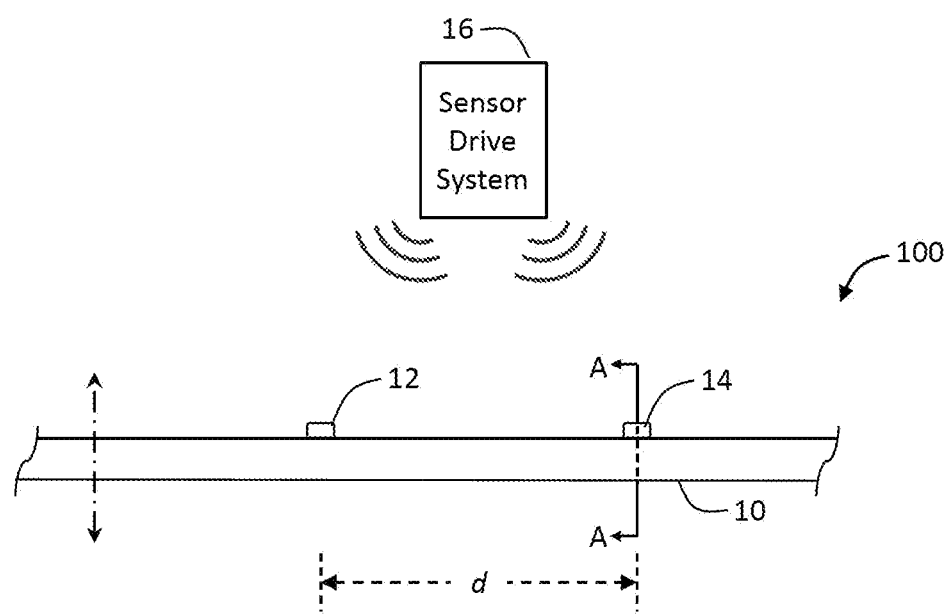
FIG. 1 depicts a schematic diagram of a structural health monitoring assembly of the present invention.

The system and method of use described herein is directed to minimally invasive or non-invasive means for determining properties in a structural element in order to support inferences into characteristics of interest. The system uses transverse vibrations propagating in a beam-type structure to determine the characteristics such as flaws in the structure.

A beam is a structural member that can be subjected to loads transverse to the longitudinal axis or at a cross section of the beam in which the loads cause the member to bend. Although an idealized beam is modeled as a one-dimensional structure for mathematical analysis; a beam can also comprise a structure having a lateral dimension that is small compared to its longitudinal dimension and the wavelength of the transverse vibration. The transverse vibrations of a beam have specific properties. This invention measures the propagation speed of such vibrations to infer those properties, and by extension, the structural health of the beam itself.

The transverse vibrations in a beam are described by the Euler-Bernoulli equation as reflected in Equation (1):

$$EI\frac{d^4\Psi}{dx^4} + \rho A\frac{d^2\Psi}{dt^2} = 0 \quad (1)$$

where "$\Psi$" is the transverse displacement, "x" is the spatial coordinate along the beam, "E" is the Young's modulus, "I" is the moment of inertia of the beam, "$\rho$" is the density, "A" is the cross-sectional area and "t" is the time.

For transverse vibrations occurring at an angular frequency $\omega=2\pi f$ where "f" is the frequency; waves assume the form $e^{i(\omega t-kx)}$ where $k=\omega/c=2\pi/\lambda$ is the wavenumber, "c" is the propagation speed, "$\lambda$" is the wavelength, and $i=\sqrt{-1}$. Substituting this form into Equation (1) leads to Equation (2):

$$EIk^4 - \omega^2\rho A = 0 \quad (2)$$

Solving for the wavenumber "k" leads to four roots, as follows in Equation (3). The roots are the solutions to Equation (2). For example, plugging "k" from Equation (3) into Equation (2) results in the left hand side of Equation (3) being equal to zero.

$$k = \pm\sqrt{\pm\omega\sqrt{\frac{\rho A}{EI}}} \quad (3)$$

Equation (4) defines two propagating waves:

$$k = \pm\sqrt{\omega\sqrt{\frac{\rho A}{EI}}} \quad (4)$$

and two evanescent modes corresponding to Equation (5). An evanescent mode is a solution to Equation (3) that does not involve propagation. The solution oscillates in time at the same frequency as the propagating solution; however, decay is along the x-direction.

$$k = \pm i\sqrt{\omega\sqrt{\frac{\rho A}{EI}}} \quad (5)$$

For the two propagating waves, the propagation speed "c" is represented by Equation (6):

$$c = \frac{\omega}{k} = \pm\sqrt{\omega\sqrt{\frac{\rho A}{EI}}} \quad (6)$$

Note that only real values of the propagation speed are used in Equation (6) because imaginary values correspond to evanescent modes that do not propagate.

Embodiments of the present invention monitor the structural health of a beam by measuring and analyzing the propagation speed of the transverse waves having beam vibrations. A crack or flaw in the beam that is large enough to affect the transverse propagation speed can trigger an alert if the change in propagation speed relative to a baseline measurement exceeds a predetermined threshold.

Figure 2:
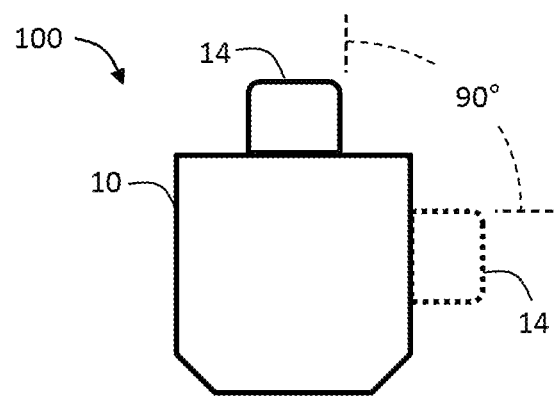
FIG. 2 depicts a cross-section view of the structural health monitoring assembly of FIG. 1 with the view taken along reference lines A-A of FIG. 1.

Referring to FIG. 1 and FIG. 2, an embodiment of a structural health monitoring system 100 includes a beam section 10 on which sensor device 12 and the sensor device 14 are non-invasively attached at a distance "d" between the sensor devices. The sensor device 12 and the sensor device 14 are accelerometers, laser vibrometers, or other similar devices capable of capturing wave or transverse vibration measurements from the beam section 10. In the event that no measurable acceleration due to transverse waves are present in the beam 10; transverse waves may be proactively introduced.

In the present embodiment, the sensor devices 12 and 14 are accelerometers that measure accelerations perpendicular or normal to the beam 10 as time series signals. In other embodiments, each of the sensor device 12 and the sensor device 14 comprise individual accelerometers positioned at mounting points in the assembly 100 such that each accelerator pair can detect a transverse wave. The detection may be a linear superposition of vertical and horizontal transverse wave components.

The sensor device 12 and the sensor device 14 are in data communication with a sensor drive system 16. The transverse waves propagate along the beam 10 to produce a time delay $\Delta t=c/d$ between the sensor device 12 and the sensor device 14. This time delay is measured to infer the propagation speed.

For example, consider a square aluminum beam with dimensions of a=0.02 meters (m) on each side, with $\rho=2700$ kg/m$^3$, A=0.01 m$^2$, E=7×10$^{10}$ Pa, f=100 Hz, and I=a$^4$/12=1.33×10$^{-8}$ m$^4$. Based on these values, the propagation speed for transverse waves is ±135.9 meters/second.

Figure 3:
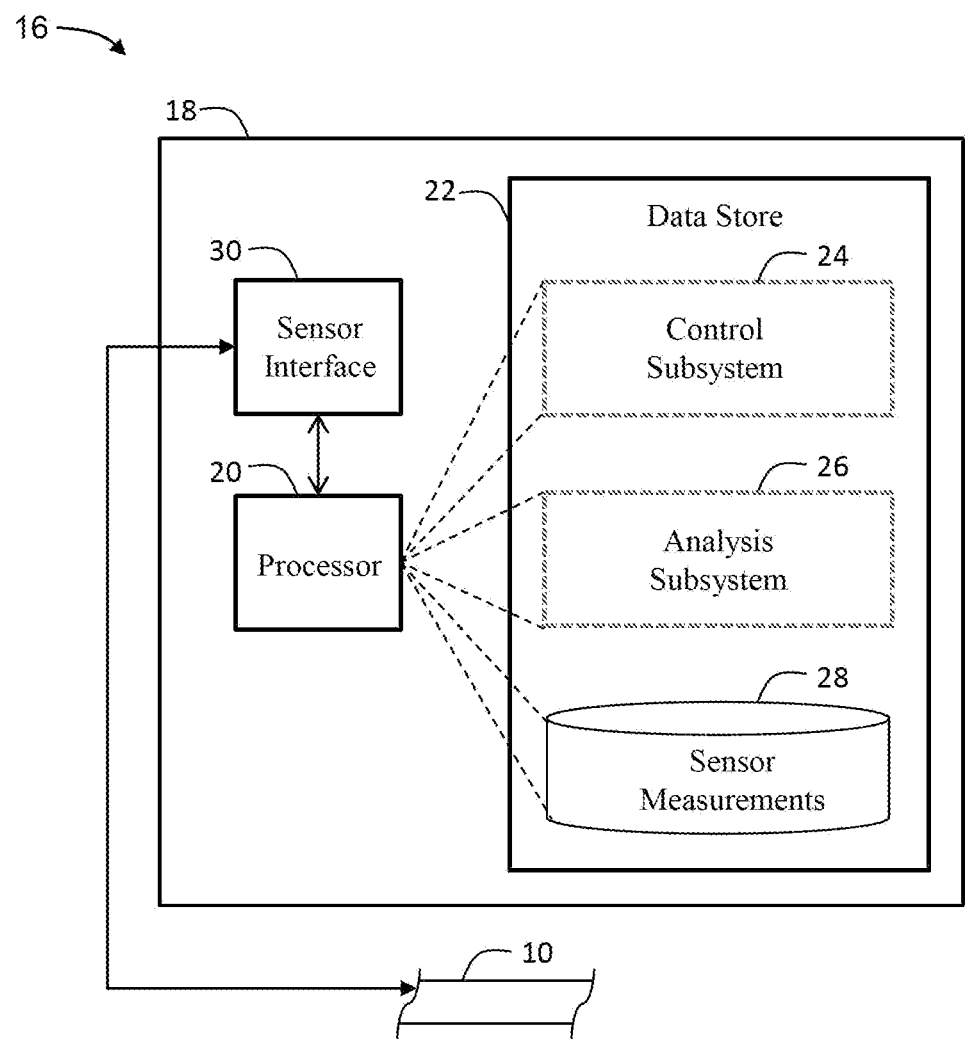
FIG. 3 depicts a block diagram of a sensor drive system of the present invention for measuring transverse vibrations using the structural health monitoring assembly of FIG. 1.

Referring to the block diagram of FIG. 3, the optical drive system 16 comprises a computing resource 18 with a processor 20 that accepts and executes computerized instructions as well as a data store 22 that stores data and instructions used by the processor.

The computerized instructions of the sensor drive system 16 implement a control subsystem 24, an analysis subsystem 26, and/or a sensor measurements database 28 stored in the data store 22 and retrieved by the processor 20 for execution of instructions. The control subsystem 24 allows the processor 20 to operate a sensor interface 30 to transmit and/or receive data with the sensor device 12 and the sensor device 14.

The analysis subsystem 26 allows the processor 20 to record and retrieve transverse wave data using the sensor measurements database 28. The processor 20 also determines time delays for transverse waves propagating between adjacent pairs of accelerators and, by inference, respective changes in the structural integrity of a beam segment (also referred to as a measured region) as a function of the propagation speed of the sensed transverse waves.

The analysis subsystem 26 is implemented using various deterministic algorithms to measure the time delay between two adjacent sensors along a beam of interest. For example, performing a cross-correlation of two time series signals yields the time delay. A one-meter separation leads to a time delay of $\Delta t=0.0074$ seconds.

The time delay is the same for transverse waves propagating in both directions and is the same for all frequencies. In embodiments that comprise multiple sensor pairs deployed along a beam; a series of time delays can be measured between pairs of sensors and the estimate of the propagation speed is then averaged to increase the accuracy of the beam health estimate.

The evanescent modes are non-propagating and quickly decay as a function of distance. These modes do not significantly affect the time delay measurements because the amplitude of the propagating waves are approximately equal at two measurement locations; while the evanescent modes have significantly different amplitudes due to attenuation. Thus, the propagating wave measurements dominate the overall measurement. Also, in contrast to the propagating waves, the evanescent modes do not exhibit a time delay between the measurement locations.

The estimate of propagation speed leads to the value of the $EI/\rho A$ parameter for the section between the sensor device 12 and the sensor device 14. If there is no damage or minimal damage to that section of the beam 10; then the value of the $EI/\rho A$ parameter will not change or will change minimally from a baseline value. However, any damage in that section of the beam 10 that significantly affects the structural properties of the beam will also significantly affect the value of the propagation speed. If the change in propagation speed exceeds a preset threshold value; then that measurement triggers an alert.

A method of the present invention for finding a flaw in a beam 10 first obtains an initial set of measurements of time delays across the beam while it is known that no significant damage or flaws are present. This initialization establishes the baseline properties of the beam 10. Continuous monitoring of time delays across the beam 10 then accumulates a record of changes to the baseline properties. If the changes exceed a threshold, the sensor drive system 16 triggers an alert for the affected region of the beam 10.

If the values of "E", "A", "$\rho$", and "I" are not known for the beam 10 to be measured; then a baseline measurement can be made by the sensor drive system 16 to establish an effective value of $EI/\rho A$ via a baseline estimate of the propagation speed "c".

Figure 4:
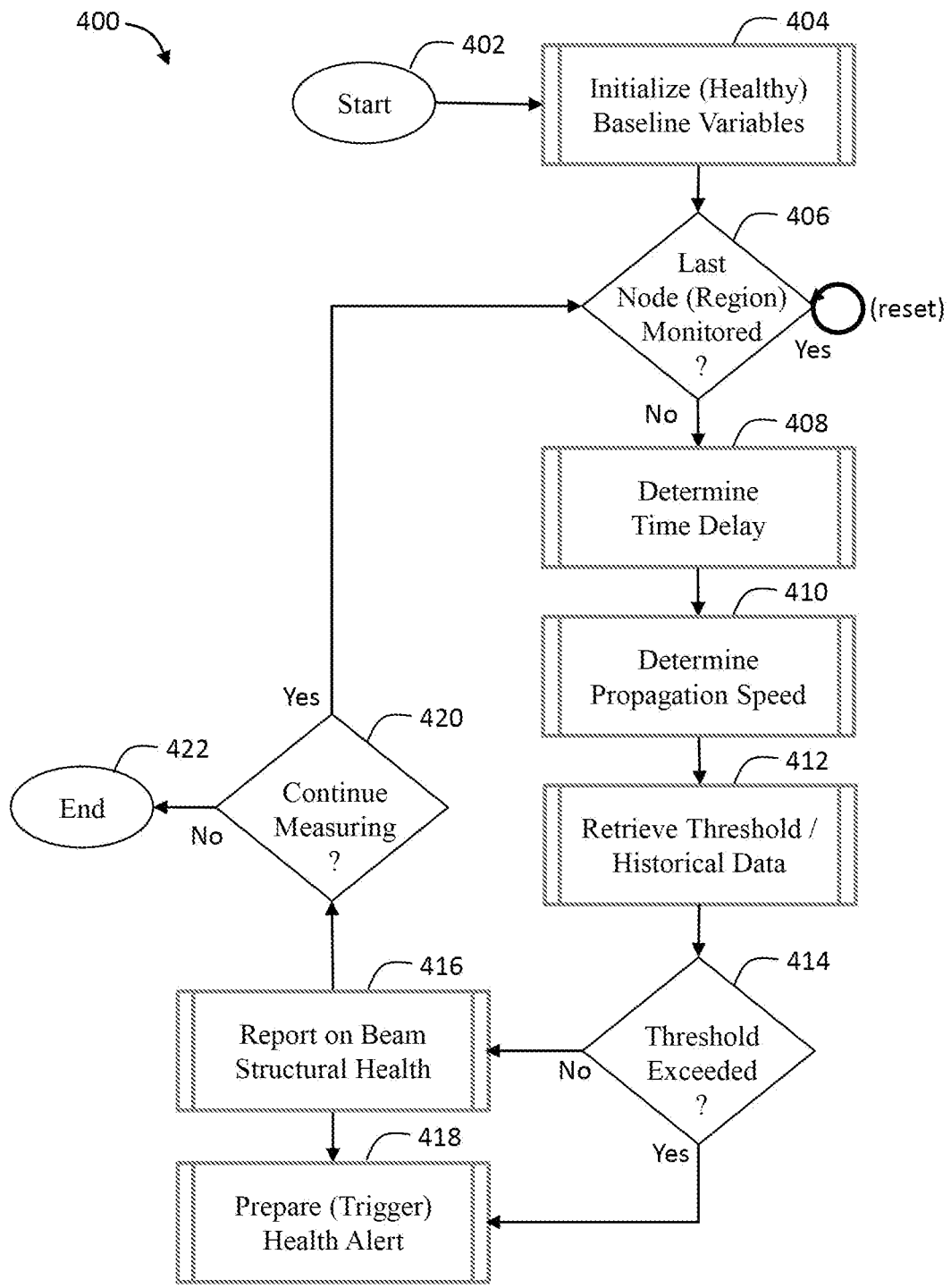
FIG. 4 depicts a flow chart of exemplary steps of a structural health monitoring method of the present invention.

Referring to FIG. 4, a flow chart 400 illustrates the sequence of operations of the present invention. Starting at Block 402 and then proceeding to Block 404; the sensor drive system 16 performs an initialization of baseline or known values. If the present invention defines a plurality "n" of unit lengths of the beam 10; then initialization values for each unit length are recorded. At Block 406, the sensor drive system 16 operates the sensors to detect a transverse wave propagating through the beam 10.

The sensor drive system 16 continues to loop onto Block 406 for each measurement region of the beam 10 to trigger determination of a time delay at Block 408 during which the transverse wave propagates the measurement region. At Block 410, the sensor drive system 16 uses the time delay and spacing distance to determine a respective propagation speed of the transverse wave for the measurement region. At Block 412, the sensor drive system 16 retrieves the alert threshold value for the measurement region.

If, at Block 414, the sensor drive system 16 determines by detection that the most recently captured transverse wave propagation speed for the measurement region does not exceed the threshold value and/or a maximum allowable change from a previous measurement; then at Block 416 the sensor drive system delivers a success condition report on the structural health of the beam.

For example, the sensor drive system 16 instructs a user interface to display the health status, and/or to forward the health status for further processing. However, if at Block 414, the sensor drive system 16 detects that the most recently captured transverse wave propagation speed for the measurement region exceeds the threshold value and/or violates a maximum allowable change from a previous measurement for that measurement region; then at Block 418, the sensor drive system 16 triggers an alert flagging damage detected in the monitored beam. This alert is conveyed at Block 416, as a negative report on the structural health of the monitored beam.

If ongoing structural health monitoring for a beam 10 is required by Block 420; the process repeats by starting at the transverse wave detection loop as referenced by Block 406. If not, structural health monitoring ends at Block 422.

Unlike conventional ultrasonic non-destructive testing, the present invention focuses on detecting changes in the effective value of the $EI/\rho A$ parameter for the measured region of the beam 10. This approach provides a representative measure of the structural integrity of the beam.

The present invention can be useful during shock testing. If a beam is damaged, then it is possible to identify where the damage initiated and how the damage propagated along the beam. This identification could lead to strategies for improving structural integrity.

Also, the present invention is scalable in beam size as well as transverse vibration magnitude; and is applicable for measuring almost any beam-like structure.

Other measurement methods include magnetic pickups, Doppler radar, Doppler LIDAR, and/or strain gage measurements to estimate and compare the transverse propagation speed to a baseline value. Another alternative is to monitor the structural health via extensional or dilatational waves.

However, the propagation speed of sound is much faster than that of transverse waves. The sound speed in aluminum is c=6300 meter/second. A one meter separation would thus lead to a time delay of $\Delta t=1.59\times10^{-4}$ seconds, which is less than that of transverse waves but is still measurable.

Extensional waves cannot be measured via Doppler methods because the waves do not generate transverse velocities that are normal to the beam surface (except with small changes in the beam width due to the Poisson effect, which will lead to very small velocities). However, extensional waves can be measured by accelerometers to measure the acceleration along the beam, or by other devices such as strain gages.

An advantage of this alternative approach is the potential use of simultaneous measurements made by extensional waves and transverse waves for the same region. Measurement is made of time delays for the extensional waves propagating between two locations simultaneous with the time delays for the transverse waves propagating between the same two locations. This yields the effective value of the EI/ρA parameter from the transverse wave time delay and from the effective value of the E/ρ parameter from the extensional wave time delay. This additional information over the same region can improve the accuracy associated with detecting any changes in the structural integrity.

The sound speed is governed only by the material properties. See Equation (7):

$$c = \pm\sqrt{\frac{E}{\rho}} \quad (7)$$

Damage in a region of the structure represents a change in the effective E/ρ parameter for that region (such as a change by a crack or flaw). Furthermore, extensional waves do not require the structure to behave as a beam.

The foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. An assembly for monitoring structural health of a beam, said assembly comprising:
    at least one pair of data collection devices non-intrusively mountable along the beam at a spacing distance that defines a section of the beam between each at least one pair of collection devices; and
    a sensor drive system configured in data communication with said at least one pair of a plurality of data collection devices with at least one processor configured with executable instructions to monitor at least one measurement region as the section of the beam, to detect with said at least one pair of data collection devices, a propagation event for a transverse wave for which vibrations cause the beam to bend, to determine a time delay for the propagation event, to determine a propagation speed for the transverse wave based on the time delay, and the spacing distance, using an EI/ρA parameter for the measurement region to determine the propagation speed, wherein "E" is Young's modulus, "I" is moment of inertia of the measurement region, "ρ" is density of the measurement region, and "A" is cross-sectional area of the measurement region, and to report, upon a mismatch of the propagation speed and a threshold, an alert condition.

2. The assembly in accordance with claim 1, wherein the instructions are further configured to initialize a plurality of baseline values.

3. The assembly in accordance with claim 1, wherein the instructions are further configured to report, upon a match of the propagation speed and the threshold, a success condition.

4. The assembly in accordance with claim 3, wherein the executable instructions are further configured to reset, upon the success condition, the threshold based on the propagation speed.

5. The assembly in accordance with claim 4, wherein each time delay defined between said at least one pair of data collection devices is based on a cross-correlation of two time series signals that yields each time delay.

6. The assembly in accordance with claim 5, wherein the instructions are further configured to create the transverse wave.

7. The assembly in accordance with claim 5, wherein the instructions are capable of being executed concurrent with shock testing of the beam.

8. The assembly in accordance with claim 5, wherein each at least one pair of collection devices comprises a first collection device mountable perpendicular to a first surface of the beam and a second collection device mountable perpendicular to a second surface of the beam, wherein the first surface is perpendicular to the second surface and said first collection device is perpendicular to said second collection device.

9. The assembly in accordance with claim 1, wherein the executable instructions further comprise simultaneously measuring, with a same said at least one pair of collection devices, extensional waves propagating between locations of said at least one pair of collection devices, using an E/ρ parameter, and transverse waves propagating between locations for the same said at least one pair of collection devices having the spacing distance between said at least one pair of collection devices.

10. The assembly in accordance with claim 1, wherein said at least one pair of collection devices comprises multiple adjacent pairs of accelerometers, with each pair bounding one measurement region comprising the spacing distance between adjacent accelerometers, such that a series of time delays are defined between adjacent accelerometers by performing a cross-correlation of two time series signals that yields each time delay between each two adjacent accelerometers of each pair, and the propagation speed is then averaged from time delays defined between the multiple adjacent pairs of accelerometers; and
    wherein measurement is made of time delays for extensional waves propagating between two adjacent accelerometers, using an E/ρ parameter, simultaneous with time delays for transverse waves propagating between the same two adjacent accelerometers.

11. A method of monitoring structural health of a beam using at least one processor configured with instructions to perform the steps of:
    initializing a plurality of baseline values including a spacing distance and a threshold;
    monitoring each of at least one measurement region, defined as a measurement region of the beam characterized by a first sensor and a second sensor non-intrusively bounding a cross section of the measurement region equal to the spacing distance between said first sensor and said second sensor;
    detecting a propagation event for a transverse wave along the spacing distance of the measurement region;
    determining a time delay for the propagation event;
    determining a propagation speed for the transverse wave based on the time delay and the spacing distance, using an EI/ρA parameter for the measurement region to determine the propagation speed, wherein "E" is Young's modulus, "I" is moment of inertia of the measurement region, "ρ" is density of the measurement region, and "A" is cross-sectional area of the measurement region; and
    reporting, upon a mismatch of the propagation speed and the threshold, an alert condition.

12. The method in accordance with claim 11, further comprising reporting, upon a match of the propagation speed and the threshold, a success condition.

13. The method in accordance with claim 12, further comprising resetting, upon the success condition, the threshold based on the propagation speed.

14. The method in accordance with claim 11, wherein each time delay defined between said first sensor and said second sensor is based on a cross-correlation of two time series signals that yields each time delay between two adjacent sensors.

15. The method in accordance with claim 11, said method further comprising the step of creating the transverse wave.

16. The method in accordance with claim 11, wherein said at least one measurement region is configured to be monitored by multiple sensor pairs deployed along the beam as adjacent pairs of sensors with each pair bounding one measurement region, thereby forming a plurality of unit lengths comprising the spacing distance, such that a series of time delays are defined between the adjacent pairs of sensors and an estimate of the propagation speed is then averaged from time delays defined between the adjacent pairs of sensors.

17. The method in accordance with claim 16, wherein said method can be configured for shock testing to identify where damage initiated on the beam and how the damage propagated along the beam between the adjacent pairs of sensors.

18. The method in accordance with claim 11, said method further comprising the step of simultaneously measuring, with a same said first sensor and said second sensor, extensional waves propagating between locations of said first sensor and said second sensor, using an $E/\rho$ parameter, and transverse waves propagating between locations for the same said first sensor and said second sensor for the same measurement region, having the spacing distance between said first sensor and said second sensor.

19. The method in accordance with claim 11, wherein said monitoring each of at least one measurement region of the beam characterized by the first sensor and the second sensor bounding a cross section of the measurement region equal to the spacing distance comprises mounting the first sensor perpendicular to a first surface of the beam and mounting the second sensor perpendicular to a second surface of the beam, wherein the first surface is perpendicular to the second surface and the first sensor is perpendicular to the second sensor.

20. The method in accordance with claim 11, wherein said at least one measurement region is configured to be monitored by multiple adjacent sensor pairs deployed along the beam with adjacent sensors of each pair bounding one measurement region comprising the spacing distance, such that a series of time delays are defined between those adjacent sensors, wherein performing a cross-correlation of two time series signals yields each time delay between each two adjacent sensors of each pair, and the propagation speed is then averaged from time delays defined between the multiple adjacent sensor pairs; and wherein simultaneous measurement is made (1) of time delays for extensional waves propagating between two locations of adjacent sensors, using an $E/\rho$ parameter, and (2) of time delays for transverse waves for which vibrations cause the beam to bend, propagating at speeds less than five hundred meters per second between the same two locations of adjacent sensors, using the $EI/\rho A$ parameter.

* * * * *